(12) United States Patent
Yoon et al.

(10) Patent No.: US 7,450,175 B2
(45) Date of Patent: Nov. 11, 2008

(54) IMAGE-PHOTOGRAPHING APPARATUS AND METHOD FOR CAPTURING AND DISPLAYING AN IMAGE IN DIFFERENT POSITIONS

(75) Inventors: Hee-joung Yoon, Suwon-si (KR); Hyun-ah Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 10/915,455

(22) Filed: Aug. 11, 2004

(65) Prior Publication Data

US 2005/0041130 A1 Feb. 24, 2005

(30) Foreign Application Priority Data

Aug. 18, 2003 (KR) .................. 10-2003-0056925

(51) Int. Cl.
*H04N 5/222* (2006.01)
(52) U.S. Cl. .............. 348/375; 348/333.1; 348/374; 348/376
(58) Field of Classification Search .......... 348/333.01, 348/333.06, 373; 455/550.1, 575; D16/202, D16/208, 211, 212, 218, 229, 234, 235, 241, D16/330; 361/683
See application file for complete search history.

(56) References Cited

U.S. PATENT DOCUMENTS

| | | | | |
|---|---|---|---|---|
| 6,249,653 B1 * | 6/2001 | Itoh et al. | .................. | 396/535 |
| 6,295,088 B1 | 9/2001 | Tsukahara et al. | ...... | 348/333.06 |
| 6,445,417 B1 * | 9/2002 | Yoshida et al. | .............. | 348/374 |
| 6,459,856 B2 | 10/2002 | Kawano | | |
| 6,643,459 B2 * | 11/2003 | Ota | ............................. | 396/84 |
| 6,658,272 B1 * | 12/2003 | Lenchik et al. | .......... | 455/575.1 |
| 6,683,653 B1 * | 1/2004 | Miyake et al. | .............. | 348/373 |
| 6,827,602 B2 | 12/2004 | Greene et al. | | |
| 6,912,005 B2 * | 6/2005 | Senda | .................... | 348/333.06 |
| 6,980,424 B2 * | 12/2005 | Kim et al. | .................... | 361/683 |
| 6,995,799 B2 * | 2/2006 | Itoh et al. | .............. | 348/333.06 |
| 7,174,195 B2 * | 2/2007 | Nagamine | ................ | 455/575.1 |
| 2004/0165106 A1 * | 8/2004 | Nakagawa | .................. | 348/373 |

FOREIGN PATENT DOCUMENTS

| | | |
|---|---|---|
| JP | 05-011322 | 1/1993 |
| JP | 06-022186 | 1/1994 |
| JP | 06-169418 | * 6/1994 |
| JP | 08-237527 | * 9/1996 |
| JP | 01-178573 | 6/1998 |
| JP | 10-178573 | * 6/1998 |
| JP | 2001-358973 | 12/2001 |
| JP | 2002-016830 | 1/2002 |

(Continued)

*Primary Examiner*—Ngoc-Yen Vu
*Assistant Examiner*—Kent Wang
(74) *Attorney, Agent, or Firm*—Roylance, Abrams, Berdo & Goodman, L.L.P.

(57) ABSTRACT

An image-photographing apparatus and method comprises a camera unit for capturing an image, a body in which the camera unit is disposed, a display panel for displaying the image, and a hinge unit connected to the display panel, for allowing the display unit to selectively turn to one of both side directions which are symmetrical with reference to the body. Accordingly, an operator can hold the apparatus with their right or left hand conveniently.

14 Claims, 11 Drawing Sheets

FOREIGN PATENT DOCUMENTS

| | | | |
|---|---|---|---|
| JP | 2002-062572 | | 2/2002 |
| JP | 2003-046817 | | 2/2003 |
| JP | 2003-051970 | * | 2/2003 |
| JP | 2004-266693 | | 9/2004 |
| JP | 2005-006098 | * | 1/2005 |
| KR | 95-30599 | | 11/1995 |
| KR | 1999-056556 | | 7/1999 |
| WO | 03-042851 | | 5/2003 |
| WO | 03/042851 | | 5/2003 |
| WO | WO 03/042851 | | 5/2003 |

* cited by examiner

IMAGE-PHOTOGRAPHING APPARATUS AND METHOD FOR CAPTURING AND DISPLAYING AN IMAGE IN DIFFERENT POSITIONS

CROSS-REFERENCE TO RELATED APPLICATIONS

This application claims the benefit under 35 U.S.C. § 119 (a) of Korean Patent Application No. 2003-56925, filed on Aug. 18, 2003, in the Korean Intellectual Property Office, the entire contents of which is incorporated herein by reference.

BACKGROUND OF THE INVENTION

1. Field of the Invention

The present invention relates to an image-photographing apparatus and method for capturing an image and storing the captured image. More particularly, the present invention relates to an apparatus and method for capturing, storing and displaying images in different positions relative to the body of the image-capturing device.

2. Description of the Related Art

A camcorder, which exemplifies an image-photographing apparatus for recording and reproducing a captured image of an object on and from a recording medium such as a tape, has been widely used.

Such a camcorder includes a lens device for capturing an image, a recording and reproducing device for recording and reproducing the captured image, and a display device for displaying the recorded images. The conventional recording and reproducing device employs a deck using a magnetic tape. However, the recent development of recording and reproducing devices such as a memory stick, a high-capacity High Definition Display (HDD), and so on, can allow a reduction in size and weight of the image-photographing apparatus.

Display devices generally includes a Liquid Crystal Display (LCD) panel openably and closably mounted to a side of a body of the camcorder, and also includes a viewfinder. Generally, the LCD panel is disposed at the left side of the camcorder body from a point of view of the photographer. That is, most camcorders are designed for right-handed users, and accordingly, the LCD panel is disposed at the left side to avoid interfering with the user's right hand. Accordingly, the opening and closing of the LCD panel is performed at the beginning and ending of the recording of an event, and the LCD panel turns by a predetermined angle when opened. Usually the viewfinder is disposed at an opposite side to a camera device.

However, if the operator is a left-handed user, because the LCD panel is designed for the right-handed user and is disposed at the left side of the camcorder, the LCD panel is inconvenient for the left-handed user to operate. Also, even if the operator is a right-handed user, the operator sometimes wants to hold the camcorder using their left hand. In that situation, the operator is inconvenienced.

SUMMARY OF THE INVENTION

The present invention has been developed in order to solve the above described problems in the prior art. Accordingly, it is an aspect of the present invention to provide an image-photographing apparatus having an improved structure and method, which is capable of selectively changing a position of a display panel to suit both the right-handed operator and left-handed operator.

The above aspect is achieved by providing an image-photographing apparatus and related method comprising a camera unit for capturing an image. The apparatus also comprises a body in which the camera unit is disposed, a display panel for displaying the image, and a hinge unit connected to the display panel, for allowing the display unit to selectively turn to one of both side directions which are symmetrical with reference to the body.

The hinge unit may comprise a first axis unit for supporting and rotating the display panel at a predetermined angle with reference to an image-photographing direction which is established by the camera unit; and a second axis unit connected to the first axis unit, for supporting and rotating the display panel at a predetermined angle with reference to a perpendicular direction of the image-photographing direction.

The first axis unit may comprise a fixing bracket fixed to the body and having a shaft hole, a shaft member inserted into the shaft hole, and a rotary bracket supported on the shaft member to be rotatable with respect to the fixing bracket, and supporting the second axis unit, and further comprises a click bracket disposed between the fixing bracket and the rotary bracket, for generating a click when the rotary bracket rotates at a predetermined angle.

The click bracket may be a plate spring that is fixed to the rotary bracket and has embossed portions protruding therefrom at a predetermined rotation angle interval for insertion into a click recess formed in the fixing bracket.

In an embodiment of the present invention, the click bracket may be disposed at the fixed bracket and embossed portions may protrude from the rotary bracket The first axis unit may further comprise a detecting switch for detecting a rotation state of the display panel.

Preferably, the detecting switch may comprise a pattern terminal panel supported by the fixing bracket, and having a switch terminal of a predetermined pattern disposed on a surface opposing to the rotary bracket; and a switching elastic piece supported by and rotating together with the rotary bracket, and elastically contacting with the switch terminal according to a rotation position to be switched on and off according to a position mode of the display panel.

The switch terminal may comprise a basic terminal shaped in a circular arc pattern with respect a rotation axis of the rotary bracket, and first, second and third mode terminals adjacent to the basic terminal and selectively connected to the reference terminal by the switching elastic piece according to the rotation angle of the rotary bracket.

Reference coordinates of the image displayed on the display panel are determined according to connection states of the basic terminal to the respective mode terminals.

The respective mode terminals each occupy a predetermined space between a reference angle 0° and a rotation angle of at least 270°, wherein the reference angle 0 is set as the display panel is seated in the body.

The first mode terminal may preferably be provided in a space between 0° and at least 135°, the second mode terminal may preferably be provided in a space between 135° and 225°, and the third mode terminal may preferably be provided in a space between 225° and at least 270°, and the first, the second, the third mode terminals may be connected to the basic terminal by the switching elastic piece.

The body may comprise a first case in which a storage medium is disposed, a second case connected to an upper portion of the first case, in which the camera unit is disposed, and a third case connected to the upper portion of the first case to be symmetrical to the second case, in which a viewfinder is disposed. Between the second and the third cases is provided a gap for movably receiving the hinge unit.

The body further may comprise a cover bracket connected to the hinge unit, for covering the gap.

The first case may comprise a panel receiving portion depressed in an outer side of the first case, for receiving the display panel, and a battery receiving portion depressed in the other outer side of the first case and symmetrical to the panel receiving portion.

The first, the second and the third mode terminals may be disposed within the same rotation radius.

BRIEF DESCRIPTION OF THE DRAWING FIGURES

The above aspect and other advantages of the present invention will be more apparent by describing embodiments of the present invention with reference to the accompanying drawings, in which.

In the drawing figures, it should be understood that in the invention like reference numerals refer to like features and structures.

DETAILED DESCRIPTION OF THE PREFERRED EMBODIMENTS

Hereinafter, an image-photographing apparatus according to exemplary embodiments of the present invention will be described in detail with reference to the accompanying drawings.

Figure 1:
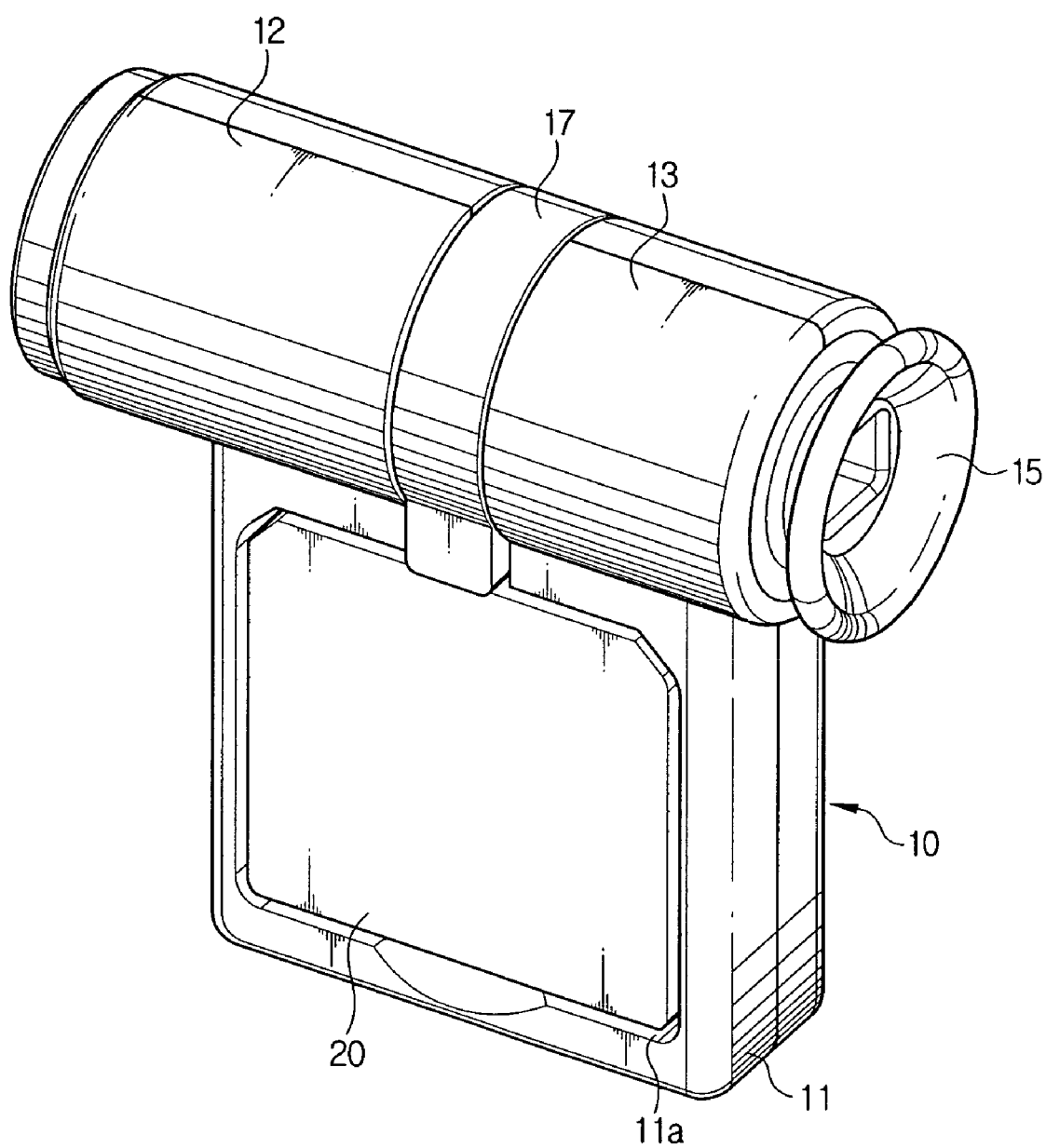
FIG. 1 is a perspective view showing an image-photographing apparatus according to an embodiment of the present invention.

Referring to FIG. 1, an image-photographing apparatus according to an embodiment of the present invention includes a body 10, and a display panel 20 movably disposed at the body 10.

Figure 2A:
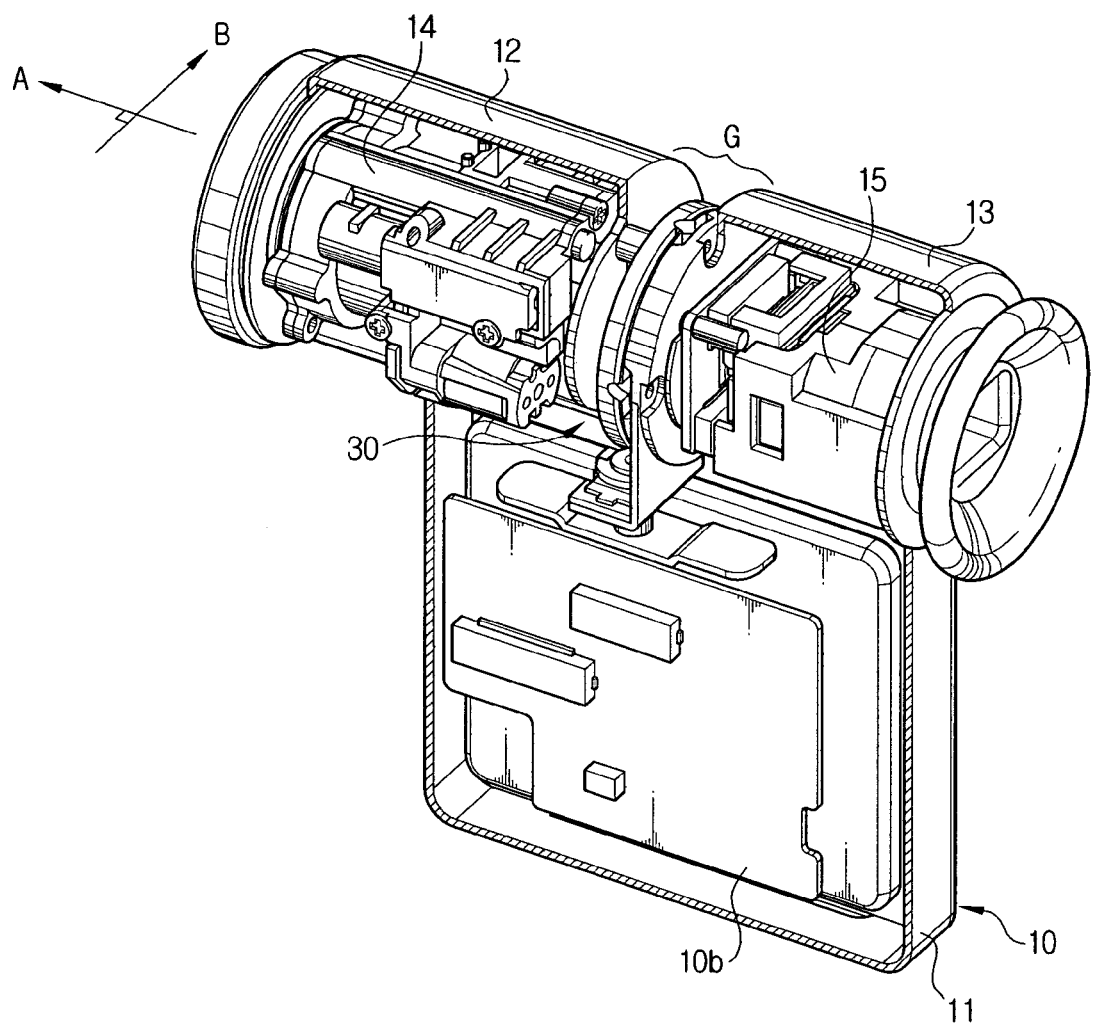
FIG. 2A is a partial cross section perspective view showing the image-photographing apparatus of FIG. 1.

As shown in FIG. 2A, the body 10 has a first case 11 in which a deck device and a circuit board 10b are mounted, and a second case 12 and a third case 13 disposed above the first case 11 and symmetrically connected to each other. The second and the third cases 12 and 13 are lens barrel type cases, and a predetermined gap G is provided therebetween. A camera unit 14 is disposed in the second case 12 to capture an image, and a viewfinder unit 15 is disposed in the third case 13.

Also, the first case 11 has a panel receiving portion 11a depressed in one side thereof. A battery receiving portion (not shown) is depressed in the other side of the first case 11, corresponding to the panel receiving portion 11a (see FIG. 1).

In order to cover the gap 'G', a cover bracket 17 is connected to a hinge unit 30. That is, the cover bracket 17 is connected to a rotary bracket 42 (see FIG. 2B), which will be described in detail later, so that it is rotated with the rotary bracket 42 while covering the gap G.

The display panel 20 is connected to the body 10 by the hinge unit 30 so that the display panel 20 is movable to right and left sides with reference to the body 10 and specifically, the first case 11. That is, the display panel 20 is configured such that it rotates about two axes, so that the display panel 20 rotates about an image-photographing direction 'A' and a predetermined axial direction 'B' perpendicular to the direction 'A'.

Figure 2B:
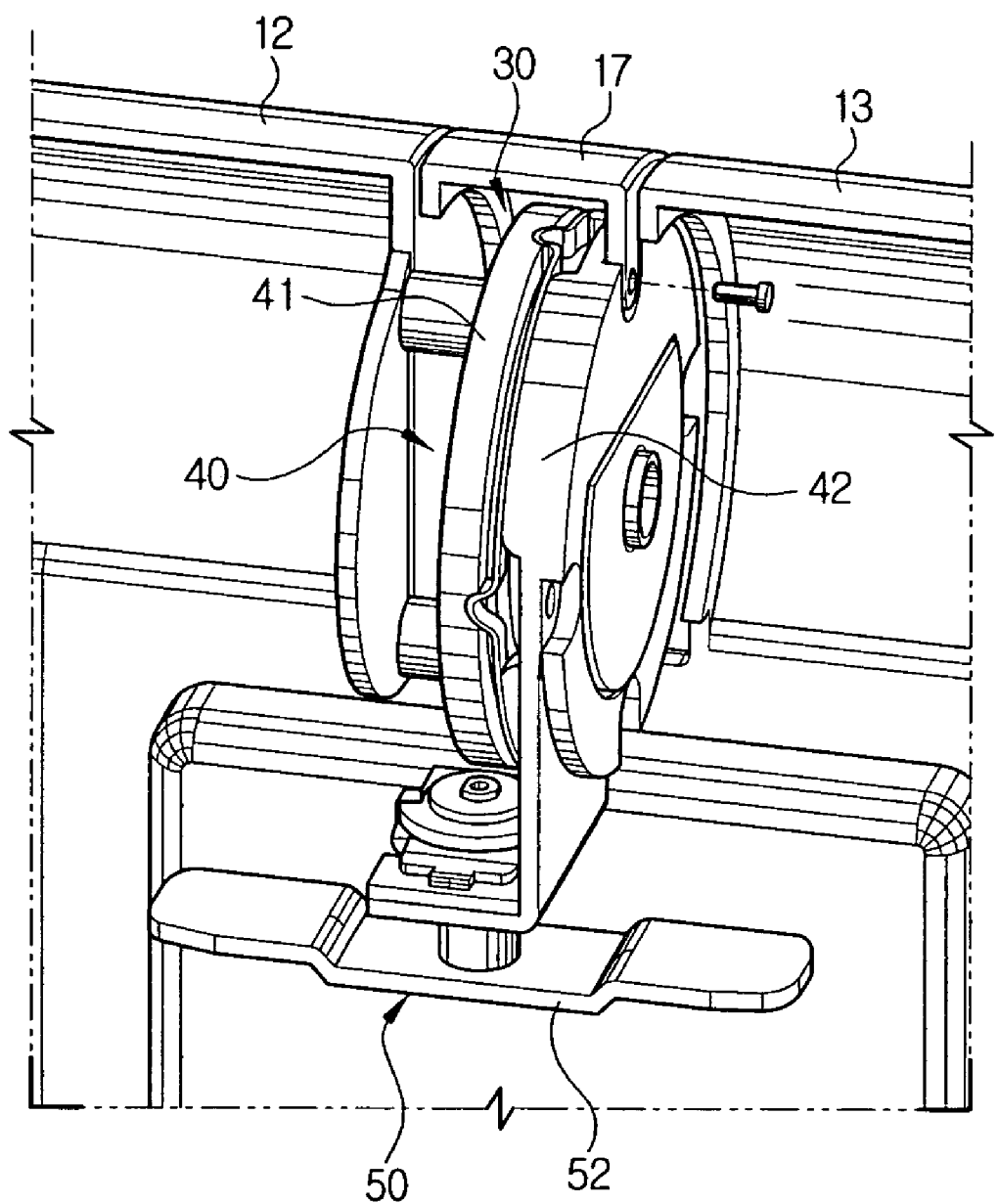
FIG. 2B is an enlarged perspective view showing the main part of FIG. 2.
Figure 3:
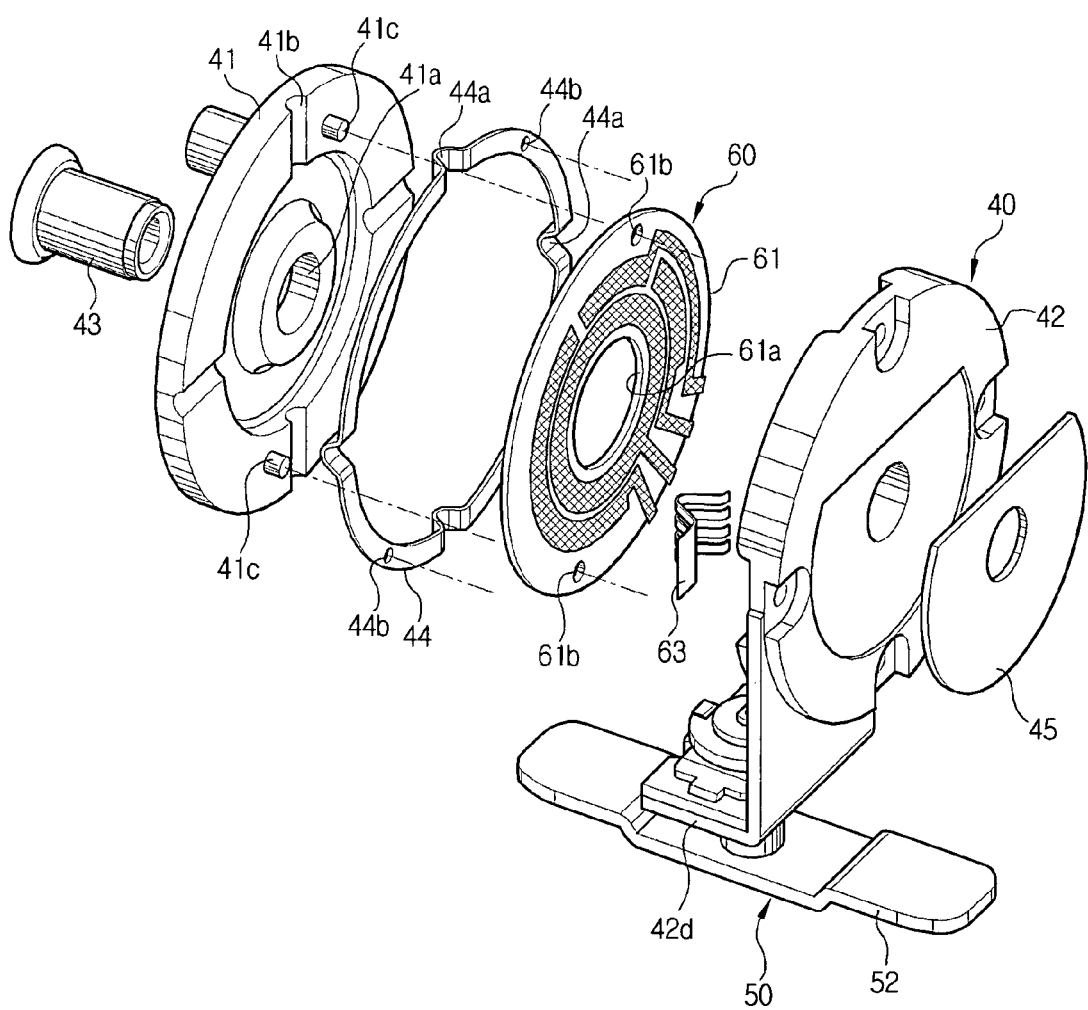
FIG. 3 is an exploded perspective view showing the first shaft unit of the hinge unit of FIG. 2A.

Referring to FIG. 2B and FIG. 3, the hinge unit 30 includes a first axis unit 40 for turning the display panel 20 about the image-photographing direction 'A', and a second axis unit 50 connected to the first axis unit 40, for turning the display panel 20 about the axial direction 'B'.

The first axis unit 40 includes a fixing bracket 41, a rotary bracket 42, a shaft member 43, a click bracket 44, and a fixing member 45.

The fixing bracket 41 is fixed to an upper end of the body 10 and specifically, to a surface of the second case 12 facing the third case 13. The fixing bracket 41 has a shaft hole 41a into which the shaft member 43 is inserted. A surface of the fixing bracket 41, facing third case 13, has a plurality of click recesses 41b and at least one protrusion 41c. The click recesses 41b are formed at a predetermined interval with respect to the shaft hole 41a.

Figure 4:
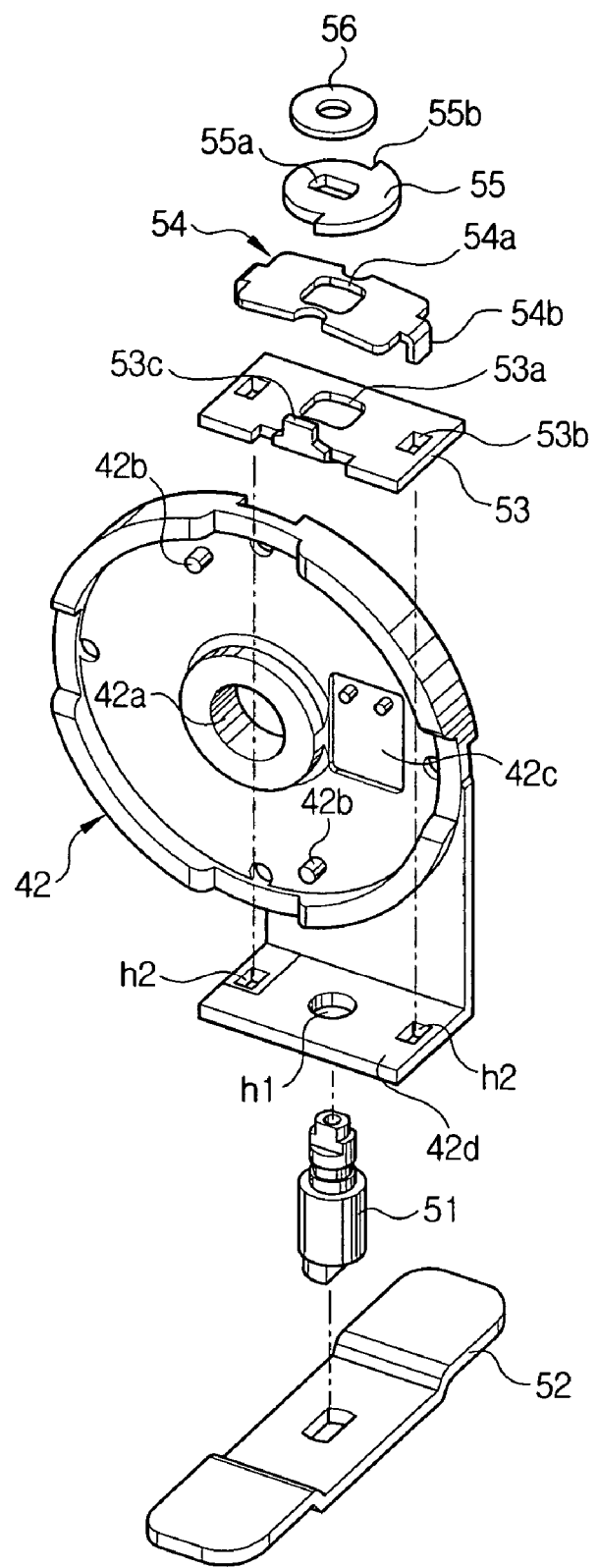
FIG. 4 is an exploded perspective view showing the second shaft unit of the hinge unit of FIG. 2A.

The rotary bracket 42 has a shaft hole 42a (see FIG. 4) into which the shaft member 43 is inserted, and supports the second axis unit 50. The rotary bracket 42 rotates about the shaft member 43 with the shaft member 43 being inserted into the shaft hole 42a. That is, the rotary bracket 42 rotates about the image-photographing direction 'A', and accordingly, the display panel 20 rotates about the image-photographing direction 'A' by a predetermined angle. Referring to FIG. 4, the rotary bracket 42 has a protrusion 42b protruding from a surface thereof facing to the fixing bracket 41, to secure the click bracket 44. Also, the rotary bracket 42 is provided with a receiving recess 42c depressed therein, for receiving and supporting a switching elastic piece 63, which will be described later. Also, a supporting portion 42d is extended from one side of the rotary bracket 42 in a curve, for supporting the second axis unit 50.

The click bracket 44 is disposed between the fixing bracket 41 and the rotary bracket 42. The click bracket 44 is a ring-type plate spring and has a plurality of embossed portions 44a formed at a predetermined interval, corresponding to the click recesses 41b. Also, the click bracket 44 has a position fixing hole 44b corresponding to the protrusion 42b of the rotary bracket 42. As the rotary bracket 42 rotates in a state that the click bracket 44 is fixed to the rotary bracket 42 in order for the protrusion 42b to fit into the hole 44b, the embossed portions 44a of the click bracket 44 are inserted into and separated from the click recesses 41b. Accordingly, a click occurs at a predetermined angle.

As one end of the shaft member 43 is fitted into the fixing member 45 and caulked, the fixing bracket 41, the rotary bracket 42 and the click bracket 44 are tightly assembled with one another, without being separated.

Referring now to FIG. 3, the first axis unit 40 further includes a sensing switch 60 to detect a rotation state of the display panel 20, 10 and specifically, a position of the display panel when the display panel 20 rotates about the image-photographing direction 'A'.

The sensing switch 60 includes a pattern terminal panel 61 supported on the fixing bracket 41 and the switching elastic piece 63 supported on the rotary bracket 42 to face the pattern terminal panel 61. The pattern terminal panel 61 is a disk-type plate having a hollow space 61a formed in a center thereof, through which the shaft member 43 penetrates. The pattern terminal panel 61 has a connection hole 61b connected to the protrusion 41c of the fixing bracket 41. The pattern terminal panel 61 may be secured to the fixing bracket 41 by an adhesive. On a surface of the pattern terminal panel 61, which faces the rotary bracket 42, is formed a switching terminal unit 62 in a predetermined pattern to be electrically connected to the switching elastic piece 63.

Figure 5:
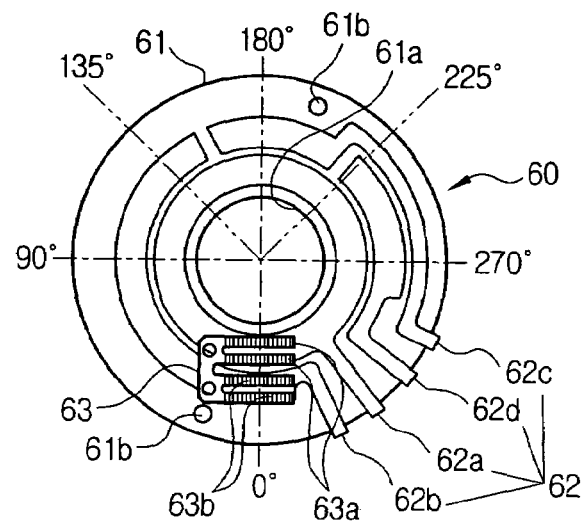
FIG. 5 is a plan view showing the detecting switch of FIG. 3.

As shown in FIG. 5, the switching terminals unit 62 includes a basic terminal 62a formed around the hollow 61a in a predetermined circular pattern, and a first, a second, and a third mode terminals 62b, 62c, and 62d formed around the basic terminal 62a in respective predetermined patterns. The basic terminal 62a maintains contact with the switching elastic piece 63.

As the rotary bracket 42 rotates, the respective mode terminals 62b, 62c, and 62d selectively come into contact with the switching elastic piece 63 to be electrically connected to the switching elastic piece 63. Accordingly, the sensing switch 60 detects a rotation angle of the rotary bracket 42 by detecting which mode terminal among the first, second, and third mode terminals 62b, 62c and 62d are connected to the switching elastic piece 63. Based on the information on the rotation angle, the sensing switch 60 detects the rotation state of the display panel 20 and determines coordinates of the displayed image. For this, the respective first, second and third mode terminals 62b, 62c, and 62d each occupies a space of a predetermined angle outside the basic terminal 62a in an arc shape, without overlapping. It is also possible that the basic terminal 62a is formed in a ring shape outside the first, the second and the third mode terminals 62b, 62c, and 62d.

In an embodiment of the present invention, the first, the second, and the third mode terminals 62b, 62c, and 62d are each formed at a predetermined angular distance from a reference angle 0°. The reference angle 0 is determined when the first mode terminal 62b contacts with the switching elastic piece 63 in a state that the display panel 20 is mounted in the panel receiving portion 11a of the body 10. As shown in FIG. 5, the first mode terminal 62b is continuously formed within a range from azimuth 0° to, at least, 135°. More specifically, the first mode terminal 62b extends to a predetermined distance between 135° to 180°. The second mode terminal 62c is continuously extended to a predetermined distance within a range from 125° to 225°, and the third mode terminal 62d is continuously formed within a range from 225° to 270°. The respective mode terminals 62b, 62c, and 62d are concentrically positioned, but occupy spaces of different azimuth angles. Preferably, the first and the second mode terminals 62b and 62c are separated from each other between 135° and 180°, and the second and the third mode terminals 62c and 62d are separated from each other between 180° and 225°.

The respective mode terminals 62b, 62c, and 62d are connected to a controller (not shown) to provide information about a connection state with the switching elastic piece 63. Based on the provided information, the controller selectively rotates the image coordinates displayed on the display panel 20 by as much as at least 90° and displays the image coordinates.

Meanwhile, the switching elastic piece 63 is fixedly inserted into the receiving recess 42c of the fixing bracket 42. The switching elastic piece 63 has a first contact piece 63a in contact with the basic terminal 62a at all times, and a second contact piece 63b adjacent to the first contact piece 63a and selectively connected to one of the mode terminals 62b, 62c and 63d by contact. In an embodiment, the first and the second contact pieces 63a and 63b are provided in pairs, each of which being formed by cutting, to thereby prevent deformations and improve a contacting property. Also, the switching elastic piece 63 and the pattern terminal panel 61 are exchangeable in their position.

Referring now to FIGS. 3 and 4, the second axis unit 50 is connected to the supporting portion 42d of the rotary bracket 42 to support and rotate the display panel 20 with respect to the axial direction 'B'. As the second axis unit 50 employs a conventional hinge construction, it includes a shaft 51 rotatably inserted into a shaft hole h1 of the supporting portion 42d, a panel supporting bracket 52 connected to a lower end of the shaft 51 inserted into the supporting portion 42d, a locking bracket 53 fixed to the supporting portion 42d and allowing the shaft 51 to rotatably pass therethrough, a plate spring typed elastic bracket 54, a rotation angle regulating member 55 and a fixing member 56 for preventing separation.

The supporting bracket 52 is connected to the display panel 20. Accordingly, the rotations of the supporting bracket 52 with respect to the shaft 51 and with respect to the rotary bracket 42 are accomplished integrally with the display panel 20. The locking bracket 53 is fixed to an upper surface of the supporting portion 42d together with the elastic bracket 54. That is, the elastic bracket 54 has a pair of fixing hooks 54b, and the fixing hooks 54b pass through a pair of passing holes 53b formed in the locking bracket 53 and are inserted into locking holes h2 formed in the supporting portion 42d. The locking bracket 53 and the elastic bracket 54 have shaft holes 53a, 54a, respectively, through which the shaft 51 is rotatably inserted. The regulating member 55 has a non-circular connection hole 55a to be connected to the shaft 51, so that the regulating member 55 is connected to the shaft in contact with the elastic bracket 54 and rotates with the shaft 51. On an outer circumference of the regulating member 55 is disposed a pair of latching portions 55b that are latched onto a regulating protrusions 53c as the regulating member 55 rotates. Since the regulating member 55 rotates in contact with the regulating protrusion 53c, the regulating member 55 is less subjected to a friction during the rotation, and also noise can be reduced. The fixing member 56 is connected to a top end of the shaft 51 to prevent the members 53, 54, and 55 from being separated from the shaft 51.

The operation of the image-photographing apparatus with the above construction will now be described.

Figure 6:
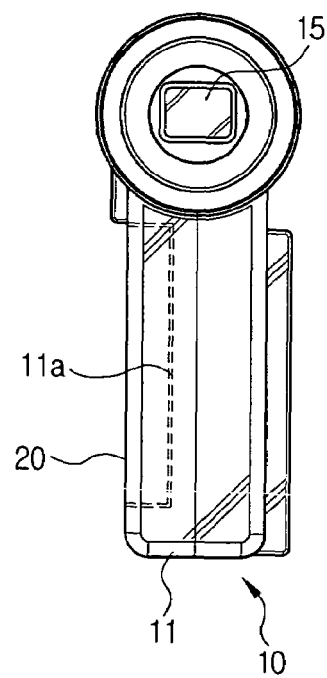
FIG. 6 is a view showing the display panel mounted in the mounting portion of the body of the display panel.

FIG. 6 shows a state where the display panel 20 is seated in the body 10 prior to being separated therefrom. In this state, the switching elastic piece 63 is positioned at the reference angle 0° as shown in FIG. 5, and the basic terminal 62a is electrically connected to the first mode terminal 62b.

Figure 7A:
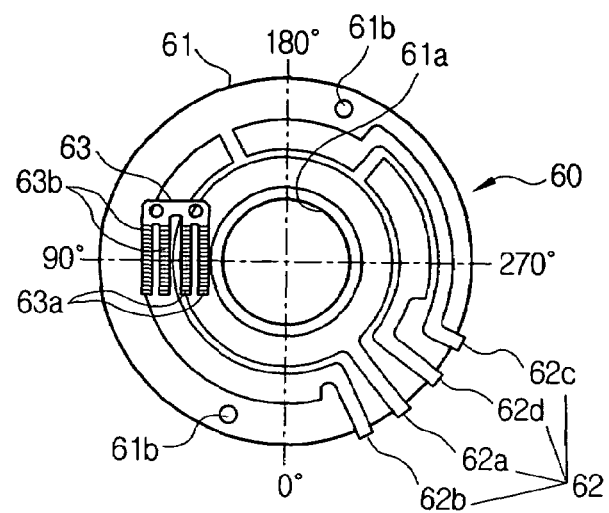
FIGS. 7A and 7B are views respectively showing the display panel rotated by 90° and a connection to the detecting switch in a state that the display panel is rotated by 90°.
Figure 7B:
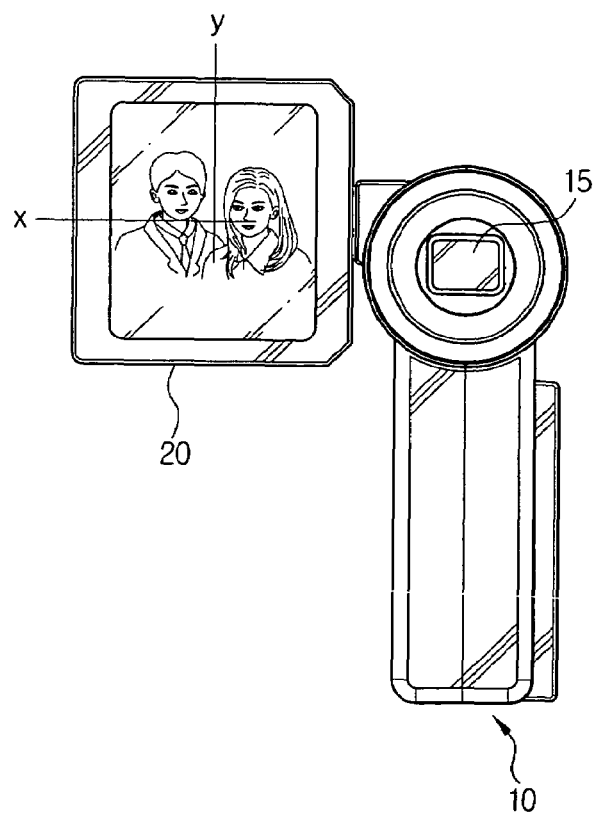

Then, the display panel 20 is rotated to a state illustrated in FIG. 7A. FIG. 7A shows the display panel 20 that is rotated at 90° by the first axis unit 40 and also rotated 90° by the second axis unit 50. Also, in this state, the rotary bracket 42 is rotated at 90°. Accordingly, the switching elastic piece 63 supported on the rotary bracket 42 is positioned at a distance, rotated from the reference angle (0°) as much as 90°, as shown in FIG. 7B. In this state, the switching elastic piece 63 is connected to the basic terminal 62*a* and the first mode terminal 62*b*. Accordingly, the image appears with an upper image and a lower image with reference to the axis 'y' on the display panel 20. Also, in a state that the display panel 20 is positioned at the left side of the body 10, it is convenient for a right-handed person.

Figure 8A:
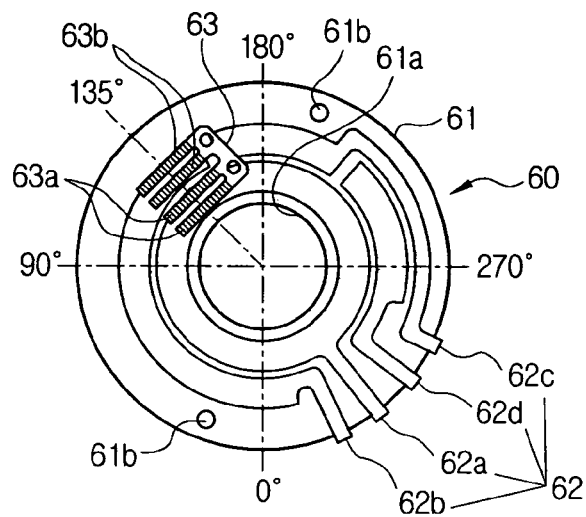
FIGS. 8A and 8B are views respectively showing the display panel rotated by 135° and a connection to the detecting switch in a state that the display panel is rotated by 135°.
Figure 8B:
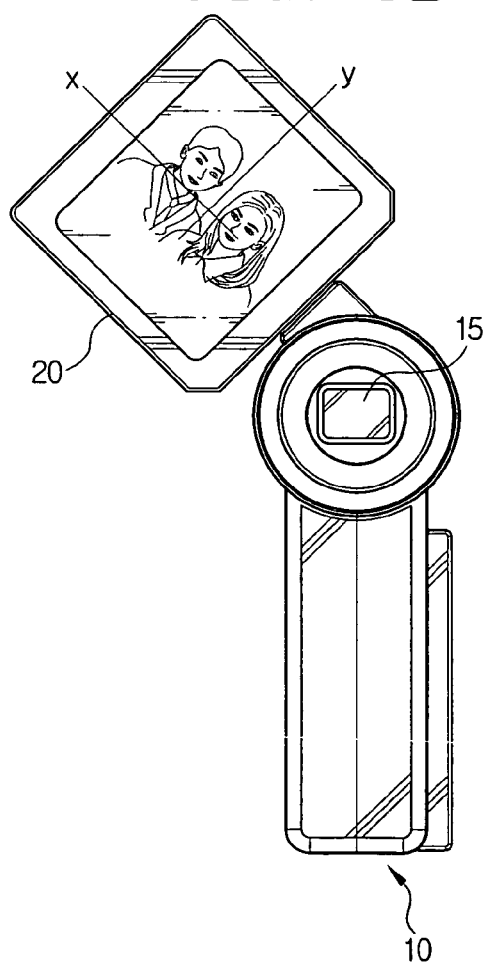

FIG. 8B shows a state where the display panel 20 is further rotated as much as 45° from the state of FIG. 7A in a counterclockwise direction. In this state, the switching elastic piece 63 is electrically connected the reference terminal 62*a* to the first mode terminal 62*b* as shown in FIG. 8A. Accordingly, the controller controls the image to be displayed on the display panel 20 with an upper image and a lower image with reference to the axis 'y'. That is, the display panel 20 shows the image appearing on the same coordinates between 0° and, at least, 135°.

Figure 9A:
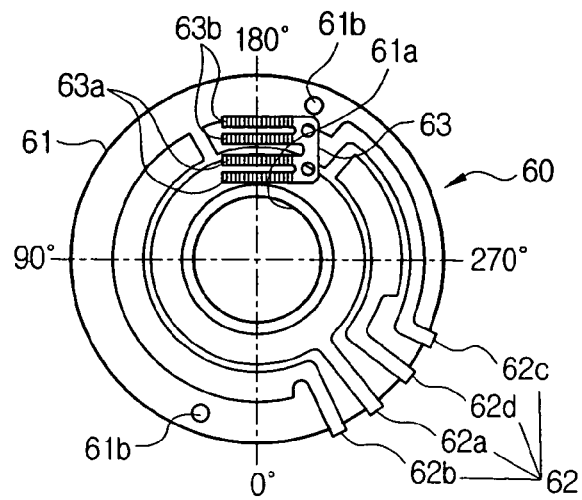
FIGS. 9A and 9B are views respectively showing the display panel rotated by 180° and a connection to the detecting switch in a state that the display panel is rotated by 180°.
Figure 9B:
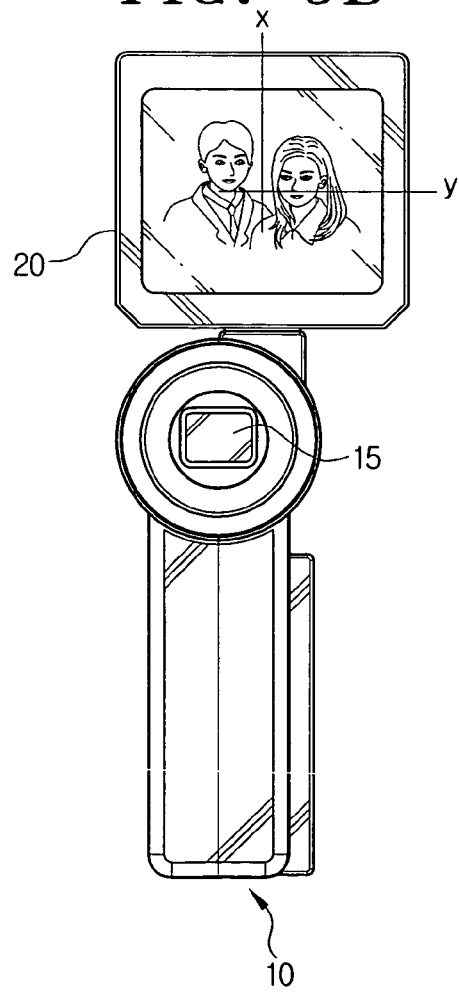

When the switching elastic piece 63 is moved toward 180° after passing 135°, the switching elastic piece 63 is separated from the first mode terminal 62*b* and comes into contact with the second mode terminal 62*c*. Then, the image displayed on the display panel 20 is reversed as much as 90°. That is, as shown in FIG. 9B, when the display panel 20 is rotated at 180° from the initial position, the image displayed thereon is reversed and appears with the upper image and the lower image with reference to the axial 'x'. As a result, the elastic piece 63 is electrically connected to the reference terminal 62*a* and the second mode terminal 62*c* as shown in FIG. 9A.

Figure 10A:
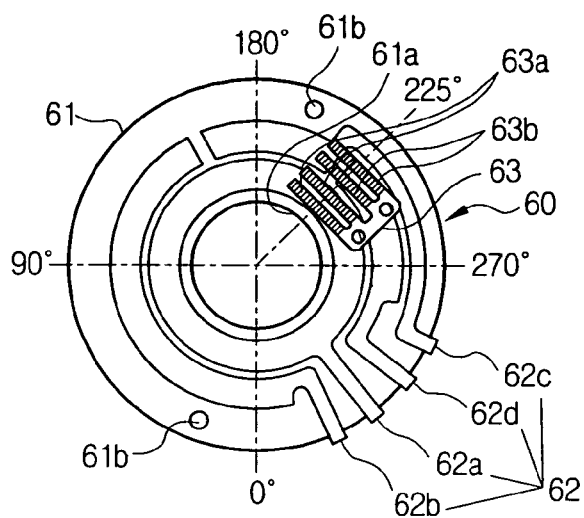
FIGS. 10A and 10B are views respectively showing the display panel rotated by 225° and a connection to the detecting switch in a state that the display panel is rotated by 225°.
Figure 10B:
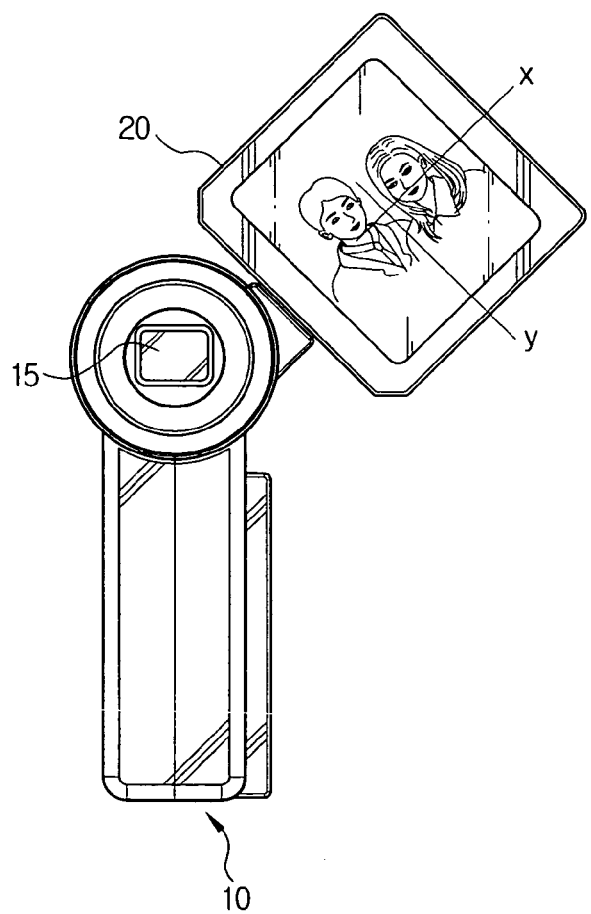

Consequently, as the display panel 20 is rotated further from the state of FIG. 9B as much as 45° as shown in FIG. 10B, the elastic piece 63 is separated from the second mode terminal 62*c* and is connected to the third mode terminal 62*d*. Accordingly, the image displayed on the display panel 20 are further reversed from the state of FIG. 9B as much as 90°. That is, the image again appears with an upper image and a lower image with reference to the axis 'y'.

Figure 11A:
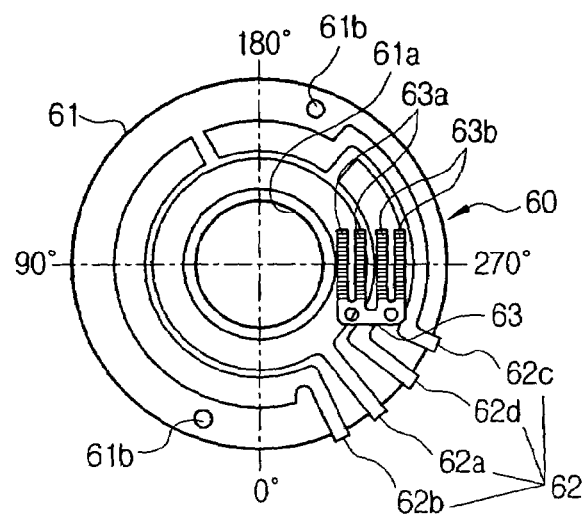
FIGS. 11A and 11B are views respectively showing the display panel rotated by 270° and a connection to the detecting switch in a state that the display panel is rotated by 270°.
Figure 11B:
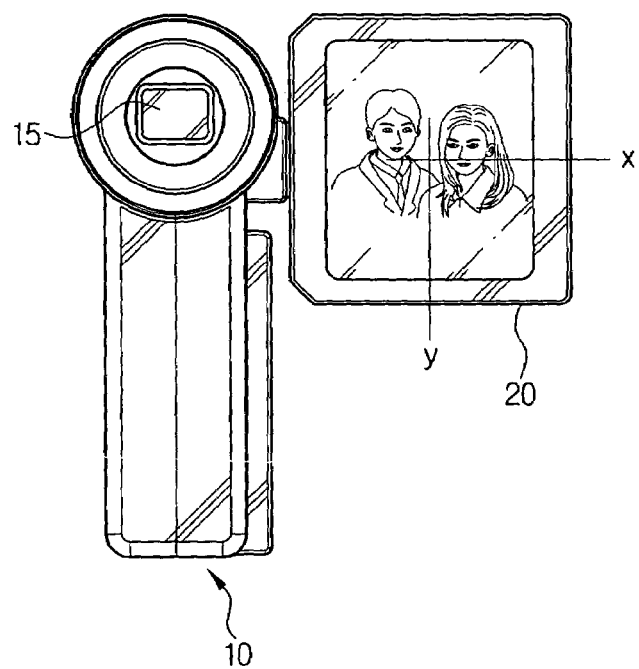

Also, as shown in FIGS. 11A and 11B, the display panel 20 can rotate further from the state of FIG. 10B as much as 45°. In this case, the switching elastic piece 63 keeps being connected to the third mode terminal 62*d*, and the image appears with the upper and lower images with reference to the axis 'y'.

Meanwhile, the state illustrated in FIG. 11A shows that the display panel 20 is turned to the right side of the body 10 completely. Accordingly, the left-handed person feels no inconvenience in holding the body 10. That is, the states illustrated FIG. 8A to 10B causes no inconvenience to both the right-handed and the left-handed persons. The state of FIGS. 7A and 7B is suit for the right-handed person, while the sate of FIGS. 11A and 11B is suitable for the left-handed person.

As described above, the coordinates of the image displayed on the display panel 20 is determined according to the rotation angle of the display panel 20. That is, the construction allows the coordinates of the image to be reversed at a predetermined angle. However, the reversing angle should not be considered as limiting, and can be selected by the operator. Also, the image photographing apparatus is properly designed so that a click by the click bracket 44 occurs after and before the image is reversed.

According to an embodiment of the present invention, since the display panel 20 can be selectively positioned at the right and left sides of the body 10, the operator can use the apparatus with their right or left hand with convenience.

Also, the image is reversed on predetermined coordinates according to the position of the display panel 20, the operator always can view a normal image during the use of the apparatus.

The foregoing embodiment and advantages are merely exemplary and are not to be construed as limiting the present invention. The description of the embodiments of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures

What is claimed is:

1. An image-photographing apparatus comprising:
    a camera unit for capturing an image;
    a body in which the camera unit is disposed;
    a display panel for displaying the image; and
    a hinge unit connected to the display panel, for allowing the display unit to selectively turn to one of both side directions which are symmetrical with reference to the body;
    wherein the body comprises:
    a first case in which a storage medium is disposed;
    wherein the first case comprises:
    a panel receiving portion depressed in an outer side of the first case, for receiving the display panel; and
    a battery receiving portion depressed in the other outer side of the first case and symmetrical to the panel receiving portion.

2. The image-photographing apparatus of claim 1, wherein the hinge unit comprises:
    a first axis unit for supporting and rotating the display panel at a predetermined angle with reference to an image-photographing direction which is established by the camera unit; and
    a second axis unit connected to the first axis unit, and supporting and rotating the display panel at a predetermined angle with reference to a perpendicular direction of the image-photographing direction.

3. The image-photographing apparatus of claim 2, wherein the first axis unit comprises:
    a fixing bracket fixed to the body and having a shaft hole;
    a shaft member inserted into the shaft hole; and
    a rotary bracket supported on the shaft member to be rotatable with respect to the fixing bracket, and supporting the second axis unit.

4. The image-photographing apparatus of claim 3, wherein the first axis unit further comprises:
    a click bracket disposed between the fixing bracket and the rotary bracket, for generating a click when the rotary bracket rotates at a predetermined angle.

5. The image-photographing apparatus of claim 4, wherein the click bracket is a plate spring that is fixed to the rotary bracket and has embossed portions protruding therefrom at a predetermined rotation angle interval for insertion into click recess formed in the fixing bracket.

6. The image-photographing apparatus of claim 3, wherein the first axis unit further comprises a detecting switch for detecting a rotation state of the display panel.

7. The image-photographing apparatus of claim 6, wherein the detecting switch comprises:
    a pattern terminal panel supported by the fixing bracket, and having a switch terminal of a predetermined pattern disposed on a surface opposing the rotary bracket; and
    a switching elastic piece supported by and rotating together with the rotary bracket, and elastically contacting with the switch terminal according to a rotation position to be switched on and off according to a position mode of the display panel.

8. The image-photographing apparatus of claim 7, wherein the switch terminal comprises:
- a basic terminal shaped in a circular arc pattern with respect to a rotation axis of the rotary bracket; and
- first, second and third mode terminals adjacent to the basic terminal and selectively connected to the reference terminal by the switching elastic piece according to the rotation angle of the rotary bracket.

9. The image-photographing apparatus of claim 8, wherein reference coordinates of the image displayed on the display panel are determined according to connection states of the basic terminal to the respective mode terminals.

10. The image-photographing apparatus of claim 8, wherein the respective mode terminals each occupies a predetermined space between a reference angle 0° and a rotation angle of at least 270°, wherein the reference angle 0 is set as the display panel is seated in the body.

11. The image-photographing apparatus of claim 8, wherein the first mode terminal is provided in a space between 0° and at least 135°, the second mode terminal is provided in a space between 135° and 225°, and the third mode terminal is provided in a space between 225° and at least 270°, and the first, the second, the third mode terminals are connected to the basic terminal by the switching elastic piece.

12. The image-photographing apparatus of claim 8, wherein the first, the second and the third mode terminals are disposed within the same rotation radius.

13. The image-photographing apparatus of claim 1, wherein the body comprises:
- a second case connected to an upper portion of the first case, in which the camera unit is disposed; and
- a third case connected to the upper portion of the first case to be symmetrical to the second case, in which a viewfinder is disposed, wherein between the second and the third cases is provided a gap for movably receiving the hinge unit.

14. The image-photographing apparatus of claim 13, wherein the body further comprises a cover bracket connected to the hinge unit, for covering the gap.

* * * * *